Oct. 15, 1935.　　　　B. M. HYMAN　　　　2,017,755
TRACTOR HARVESTER THRESHER
Filed March 8, 1935　　　3 Sheets-Sheet 1
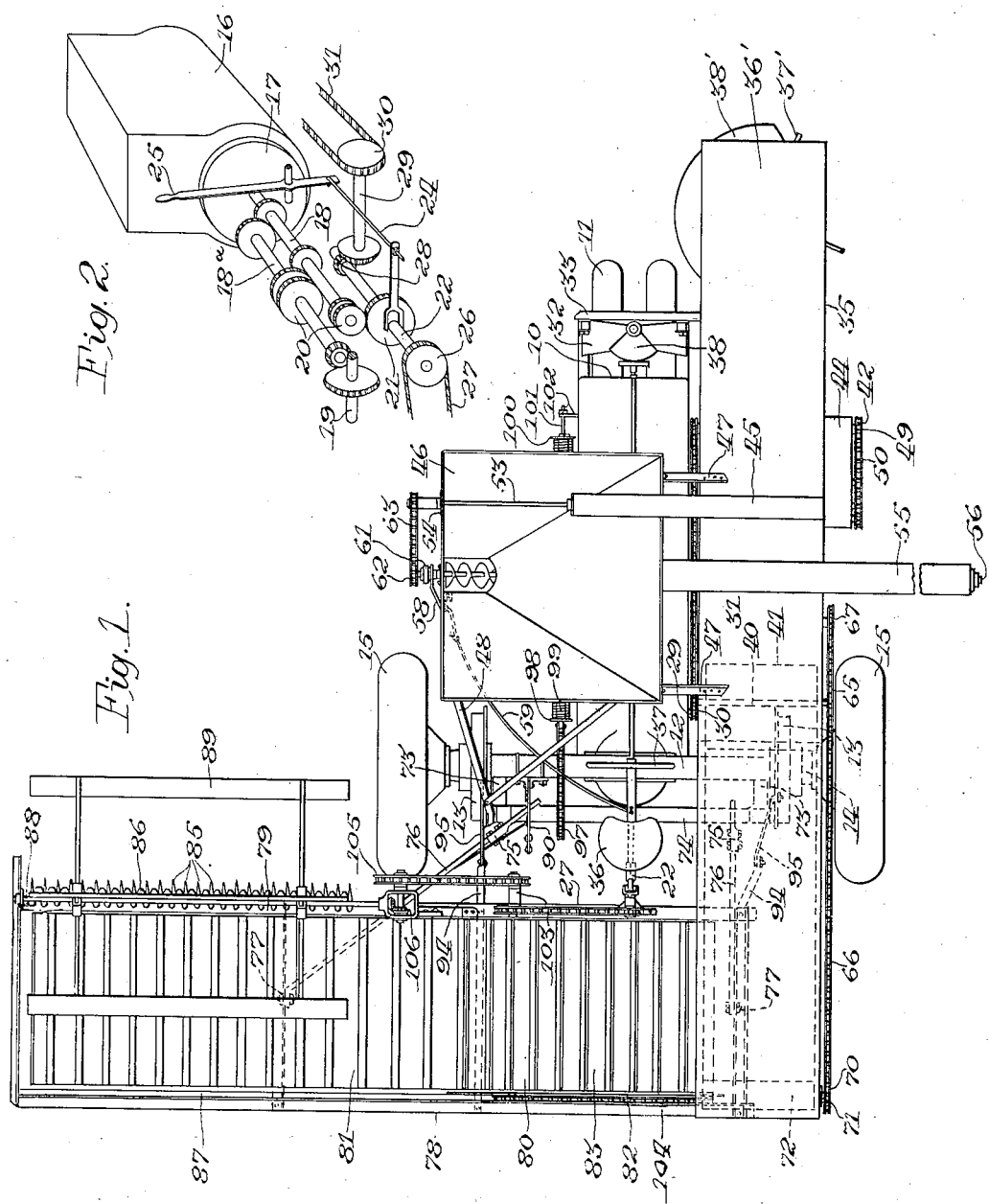
Inventor
Benjamin M. Hyman
By V. F. Lassague
Atty.

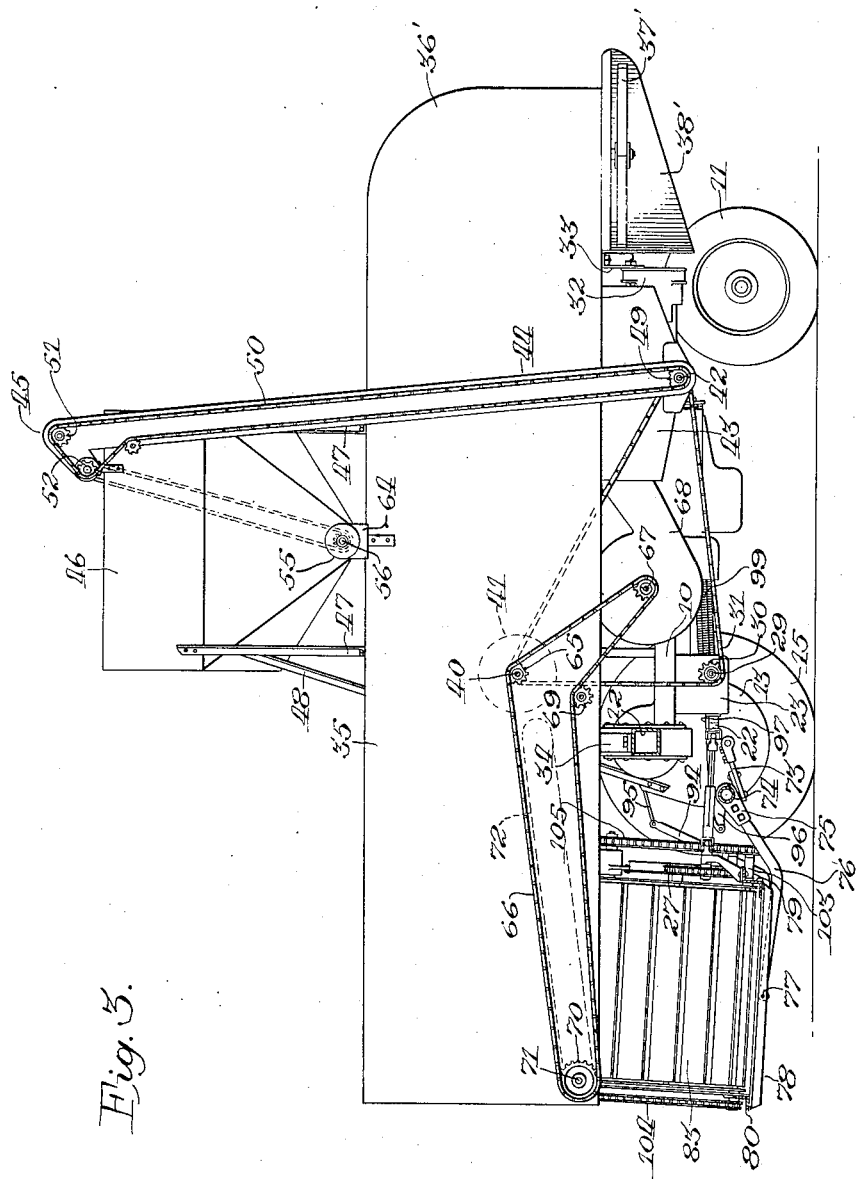

Oct. 15, 1935.  B. M. HYMAN  2,017,755
TRACTOR HARVESTER THRESHER
Filed March 8, 1935  3 Sheets-Sheet 3

Inventor
Benjamin M. Hyman

Patented Oct. 15, 1935

2,017,755

UNITED STATES PATENT OFFICE 2,017,755

TRACTOR HARVESTER THRESHER

Benjamin M. Hyman, Moline, Ill., assignor to International Harvester Company, a corporation of New Jersey Application March 8, 1935, Serial No. 9,937

10 Claims. (Cl. 56—20)

The invention relates to a tractor mounted and driven harvester thresher.

Tractors of the general purpose type, having a central front wheel steering truck and two widely spaced rear traction wheels, are now much in use. Many forms of implement attachments are utilized with tractors of this type, but, so far as is known, no one has yet provided a harvester thresher that may be associated with such tractor. These tractors have a narrow longitudinal central frame with the rear axle housing extending laterally from each side thereof at its rear end. It is desirable to take advantage of this peculiar tractor body arrangement to support the parts of a harvester thresher in operative relationship without interfering with the ability of the tractor operator to maneuver the tractor and to exercise complete control over the attached machine.

Harvester threshers comprise a thresher part and an associated harvester part, the former being disposed parallel with the line of travel, while the latter is transversely disposed in cutting position. This is the usual position of these parts in use and it is desirable that such relation be maintained when they are to be tractor mounted.

These tractors also have a longitudinally rearwardly extending power take-off shaft and a transversely extending pulley power take-off shaft. As the harvester thresher embodies two main operative parts, as has been described, it is desirable separately to drive such parts from the two power take-off shafts mentioned.

The main object of the invention is to provide an improved tractor mounted harvester thresher particularly adapted for wide tread tractors of the general purpose type and in which the harvester part will be mounted transversely at the rear of the tractor and be driven from the power take-off shaft of the tractor, while the thresher part will be mounted on the tractor longitudinally alongside the narrow body thereof and be driven from the pulley take-off shaft.

Another object of the invention is to provide an improved counterbalance for the harvester part to be associated with the tractor body in an improved manner.

Still another object is to locate the longitudinal thresher part in an improved manner on the tractor with the straw discharge end of the thresher part located adjacent the forward end of the tractor.

Another object is to locate a grain collecting tank on the tractor on the opposite side thereof from the location of the thresher part in such a manner that proper balance and weight distribution result.

It is also an important object to provide an improved means for connecting the harvester part to the rear end of the tractor.

Other important objects will become apparent to those skilled in this art as the disclosure is more fully made.

Briefly, such objects are achieved by the structure herein disclosed in which the rear end wide tread axle structure of the tractor carries a support, such as a draw-bar, on which is carried a harvester line bar supporting element. Said line bars carry the transverse harvester part which projects laterally to one side of the rear end of the tractor to be disposed in its cutting position. The line bar supporting element is rockable and carries a bracket movable therewith and associated with a longitudinally forwardly extending counter-balance spring mechanism running alongside the tractor body and having its front end connected thereto. The tractor rear axle structure carries a lever for adjusting the height of cut of the harvester. The harvester feeds the cut material into the rear end of a longitudinally disposed thresher part supported on the rear axle of the tractor and extending forwardly alongside the narrow central body of the tractor with the straw discharge end of the thresher part disposed adjacent the front part of the tractor where a suitable support, carried by the tractor body, serves to carry the front end of the said thresher part. The opposite, or grainward, side of the tractor carries an elevated grain storage tank in balanced relation with the thresher part for evenly distributing the weight of these parts in a stable manner on the tractor. The harvester driven parts are connected to be driven from the rear power take-off shaft of the tractor, while the driven parts of the thresher part are connected to be driven from the side transverse pulley take-off shaft of the tractor.

Looking now to the drawings illustrating a practicable example of the invention,—

Figure 1 is a general plan view of the improved tractor mounted and driven harvester thresher;

Figure 2 is a diagrammatic perspective view of the tractor transmission to illustrate the location of the rear power take-off shaft and the side pulley take-off shaft and the control means therefor;

Figure 3 is a side elevational view of the machine shown in Figure 1, as viewed from the stubbleward side;

Figures 4, 5, 6:
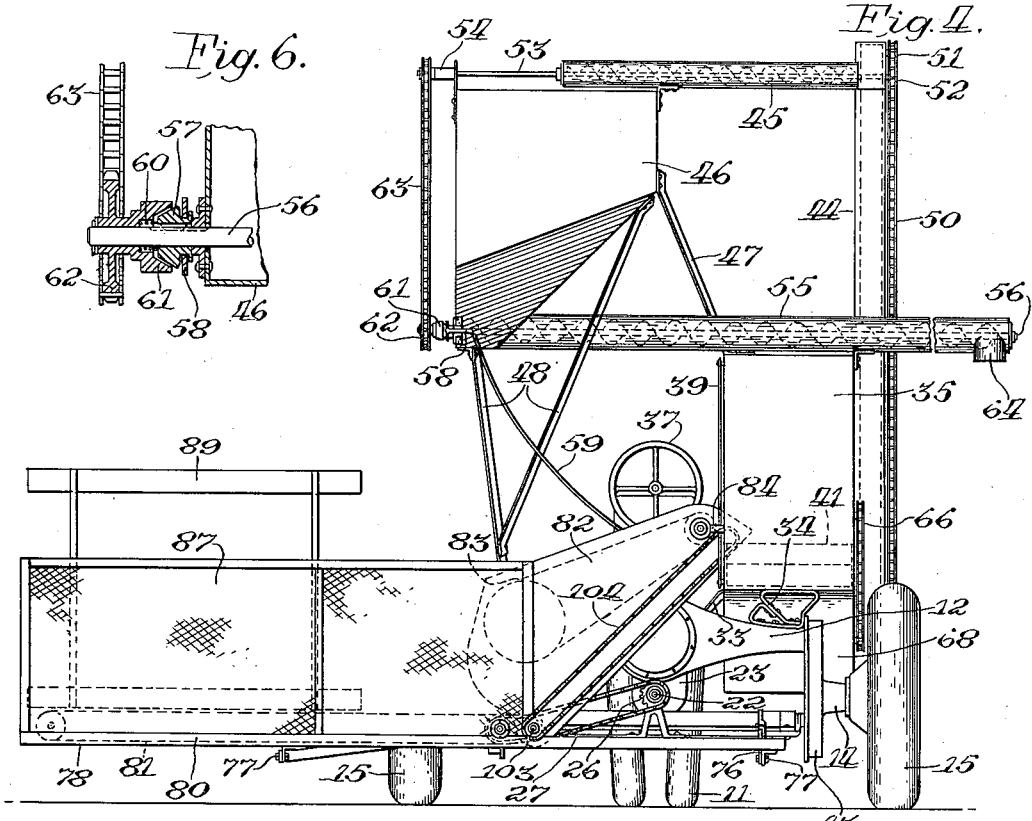
Figure 4 is a rear elevational view of the tractor harvester thresher.
Figure 5 is a detail side elevational view, partly in section, to show the counter-balancing mechanism between the tractor and harvester; and, Figure 6 is a detail sectional view of the tank unloader drive control parts.

The tractor shown is of the three-wheel general purpose type having a central longitudinally disposed narrow body or frame 10, supported at its front end by the front wheel, steering truck 11 and at its rear end being connected with a high arched, transverse rear axle structure 12 including depending side housings 13 carrying stub axles 14 and the rear, widely spaced traction wheels 15, which here carry rubber air tires, as shown.

The tractor has the usual front location on the frame 10 for a motor 16, which, as diagrammatically shown in Figure 2, in the usual way, through an engine clutch 17, drives the engine shaft 18 of a usual change speed gear set including a counter-shaft 18a geared to drive a transverse axle differential shaft 19 for propelling the rear wheels 15 through the change speed gears generally shown at 20. A gear 21 on a power take-off shaft 22 may be driven to operate said shaft, which extends longitudinally and centrally to the rear from the gear box 23 shown in Figure 3. This gear 21 is splined on the take-off shaft 22 for shifting movement relative to the adjacent gear 20 by means of linkage 24 and a lever 25. The rear end of this shaft 22 carries a sprocket wheel 26, which drives a transverse chain 27 for a purpose later to appear in connection with operation of the harvester part presently to be described. This take-off shaft 22 also carries a bevel gear 28 for driving a transversely extending pulley shaft 29.

The usual pulley has been removed from the end of this shaft, which also protrudes from the gear box 23, and in lieu of the pulley, a sprocket wheel 30 is provided to drive a longitudinally running chain 31 for driving operative parts of the thresher part later to be described. When the gear 21 is in meshing relation with the proximate gear 20 of the change speed gear set, both shafts 22 and 29 turn, and, conversely, when these gears are out of mesh, the said two shafts stand still. Thus, the two take-off shafts 21 and 22 may be driven together or be simultaneously not driven, and this may take place through the selective change speed transmission irrespective of whether the tractor is being propelled or is standing still.

The front end of the tractor body 10 includes a bolster or implement attaching bracket 32, to which is securely connected a transversely and stubblewardly extending angle bar 33, said bar extending outwardly to about the inner edge of the line of travel of the stubbleward tractor drive wheel 15. As shown in Figure 4, the stubbleward end of the rear axle housing carries a bracket 34.

Mounted on these supports 33, 34 is a longitudinal housing 35 comprising the thresher part of the tractor harvester thresher, the same being arranged parallel with the body 10 of the tractor and adjacent the tractor operator's seat 36 located centrally on and between the ends of the rear axle housing 12, as shown best in Figure 1. In front of the seat is a hand wheel steering control 37 for operating connections 38 to angle the front wheel truck 11 for steering the tractor in the usual way.

This thresher part 35 extends forwardly a short distance of the front end of the tractor, as shown in Figure 1, the forward end constituting a straw dump hood 36', which is open at its under side to dump the discharging straw and chaff onto a rotary straw spreader 37' appropriately driven from any suitable moving part of the thresher mechanism. The tractor side of the spreader 37' is surrounded by an appropriate shield 38' to keep the straw from being thrown into the path of the steering wheels 11 and into the radiator arranged in front of the motor 16.

The rear end of this thresher housing 35 extends over the rear axle housing 12 of the tractor to a substantial distance rearwardly of the tractor, as seen in Figure 1, the rear portion of the housing 35 constituting the feeder end, the tractor side of which is open and bounded by vertical guide rails 39 for a purpose later to appear.

The chain 31 heretofore described, as shown in Figure 3, extends upwardly to drive a transverse shaft 40 carrying within the housing 35 the threshing cylinder 41 shown in dotted lines in Figures 1 and 3. The same chain 31 also extends forwardly in a loop to drive a transverse shaft 42, which is located at the lower end of a grain cleaner unit 43 located in turn below the thresher body 35. This shaft 42 carries the clean grain auger, not shown, which conveys the grain to the stubbleward side of the body 35 where it is taken by an elevator 44.

The elevator carries the grain upwardly to a cross conveyer 45 that discharges the material into an open top tank 46, which is suitably supported by braces 47 from the body 35 and by braces 48 to the tractor rear axle structure, said tank being elevated, as shown, and arranged at the grainward side of the tractor where it counter-balances the weight of the thresher part 35. This arrangement of thresher and tank serves evenly to distribute the weight of these parts on the tractor.

The stubbleward end of the shaft 42 carries a sprocket wheel 49 to drive a chain 50 in turn driving a sprocket wheel 51 at the top of the housing 44 to operate the grain elevator therein. Said chain 50 also drives a sprocket wheel 52 to operate an auger and shaft 53 inside the housing 45, said shaft, as shown in Figure 4, being journaled at its grainward end in a bracket 54 carried on the tank 46.

In the bottom of the tank is a transverse power unloading auger conveyer 55, as shown in Figure 4, which includes a shaft 56, as appears also in Figure 6, carrying outside the tank 46 a loose and slidable clutch element 57 movable by a shifter element 58 operated by a pull rope 59 from the seat 36 by the operator. When the rope is pulled, the element 57 moves axially on the shaft 56 against the pressure of a spring 60 drivingly to engage a continuously driven clutch element 61 formed integrally with a sprocket wheel 62 that is driven by a chain 63 from the shaft 53. From this it can be seen that the spring 60 normally holds the clutch 61, 57 released and keeps the unloader auger 55 inoperative. This unloader 55 extends transversely in a stubbleward direction and extends over the side of the outfit, as seen in Figure 4, to discharge the contents of the tank 46 into any appropriate vehicle standing alongside the tractor, said unloader 55 having a discharge spout 64 at its free end to direct the material properly into such vehicle.

The cylinder shaft 40 at the stubbleward end thereof, outside the housing 35, carries a sprocket wheel 65 for driving an endless chain 66, said chain driving a sprocket wheel and transverse shaft 67 for operating a blower, not shown, but arranged conventionally in a fan housing 68 below the housing 35 and forwardly of and in communication with the cleaning unit housing 43 already described. Further, this chain 66 is trained around an idler guide sprocket 69 and a drive sprocket wheel 70 at the rear end of the housing 35, as shown in Figure 3. This wheel 70 is on a shaft 71 to drive a feeder conveyer 72, shown in dotted lines, which feeds the material from the harvester to the threshing cylinder 41.

From the description thus far given, it will now be seen that all operative parts of the thresher part 35 and its associated tank 46 are driven by the pulley take-off shaft 29 of the tractor. The harvester part and the manner of associating it with the tractor and thresher part will next be described.

The depending housing portions 13 of the rear axle structure of the tractor carry a suitable support 73, which in practice may be the usual U-shaped horizontally, rearwardly extending drawbar of the tractor. The ends of the support carry brackets for turnably carrying a transverse torque tube support 74, which in turn has made fast thereto a pair of spaced rearwardly extending ears 75, each having secured thereto a downwardly and rearwardly extending line lever or bar 76, the rear ends of which have pivotal connection at 77 with the under side of a transverse harvester platform 78 to support the same.

This platform includes the usual transverse front Z-bar 79 and rear parallel angle bar 80, between which the platform 78 carries the usual endless apron type of conveyer 81. The stubbleward end of this conveyer 81 feeds the cut grain to an elevator 82, including a conveyer 83, for elevating the material into the feeder end of the housing 35 and to the feeder conveyer 72 therein, said elevator 82 including slide brackets 84 guided for up and down movement on the vertical rails 39 heretofore described.

The Z-bar 79 in the usual way carries the guard fingers 85 for the reciprocatory knife 86, while the rear angle bar 80 carries a backboard 87. Suitable and conventional end supports carry the transverse reel shaft 88 above the cutting apparatus and on which shaft is a reel 89 cooperating with the cutting apparatus in the well known manner to lay the cut grain on the conveyer 81. As shown best in Figure 1, the elevator 82 is disposed transversely of the rear end of the tractor and it feeds at a right angle into the rear or feeder end of the thresher part 35. The harvester platform structure described also extends transversely in end to end relation with the elevator 82, said platform extending grainwardly of the tractor where the operator on his tractor seat 36 has at all times a full view of the harvesting operation.

The platform is adjusted up and down to alter the cutting position thereof by a hand lever 90 including the usual detent lock associated with a toothed quadrant 91 mounted adjacent the lever on the rear axle housing 13 of the tractor. Said lever has connected to it a link 92 connected at 93 to the inner line lever 76. At a spaced interval, the under side of the platform 78 carries members including upstanding portions 94 having pivotal connection with links 95 in turn pivoted to the respective housings 13 of the tractor adjacent the upper end thereof. These links 95 with the line levers 76 in effect form a parallel ruler type of linkage to maintain the platform 78 substantially horizontally level in all of its positions of up and down adjustment, as determined by the hand lever 90.

While the lever 90 is made as long as it is conveniently possible, it nevertheless is quite a task to manipulate the weight of the harvester platform structure for adjusting it, as has been described, and accordingly a simple form of spring counter-balance is provided to spring the weight thereof. Accordingly, as appears in Figures 1 and 5, the torque tube support 74 carries a cam-shaped bracket 96 to rock with the pipe 74, said bracket 96 having connected to it a flexible element, such as a chain 97 that runs forwardly and is connected to the head plate 98 of a battery of tensioned springs 99 anchored in another head 100. Said head includes an adjustably mounted threaded bolt 101 carried in a bracket 102 connected to the grainward side of the tractor body 10. Obviously, these springs 99 counter-balance the weight of the rear mounted harvester part.

The various operative mechanisms of the harvester part are driven from the power take-off shaft 22 of the tractor. It will be remembered that this shaft carries a sprocket wheel 26 for driving a chain 27. Said chain 27 drives a shaft 103 carried longitudinally across the stubbleward end of the platform 78. The rear end of the shaft 103 carries a sprocket wheel to drive a chain 104 for operating the usual elevator conveyer apron within the elevator part 82. The front end of the shaft 103 is provided with a sprocket wheel to drive a chain 105 for operating gearing 106 to drive the reel shaft 88. From these driving connections in any conventional way, power may be taken to drive the platform conveyer 81 and knife 86.

From this description it is now clear that all operative mechanisms of the harvester part are driven from the power take-off shaft 22 of the tractor transmission, while all operative mechanisms of the thresher part are driven from the pulley take-off shaft 29. The lever 25, by shifting the gear 21 into and out of mesh with the gearing 20, serves to establish these driving connections or to disengage them. Both drives to both parts of the harvester thresher are operative at the same time or inoperative at the same time.

All parts of the attached implement are completely supported from the body of the tractor and in such relative positions as to best solve the problem of correct balance and weight distribution. In operation, the grain is cut by the harvester and delivered by the conveyer 81 to the elevator 82, which in turn conveys the material uphill into the feeder end of the right angularly disposed thresher 35, where the feeder conveyer 72 moves the material forwardly to the threshing cylinder 41. From thence on, the material is operated on by the usual grain treating mechanism while it is advancing forwardly through the housing 35, or in the direction of travel of the outfit. Eventually the chaff and straw is ejected from the front end of the housing 35 onto the straw spreader 37' for scattering over the ground, while the cleaned grain is delivered into the tank 46 by the elevator 44 and conveyer 45. When the tank is filled to capacity, the tractor is brought to a stand-still to permit a vehicle such as a motor truck or wagon to be moved into position alongside the tractor and under the discharge spout 64, whereupon the tractor operator, from his seat on the tractor, pulls the control rope 59 to engage the clutch of Figure 6 to drive the power unloader 55, to empty the contents of the tank.

During cutting of the grain, the platform is easily adjusted to alter the height of cut by means of the lever 90, the counter-balance 99 serving to aid this adjustment in an obvious manner.

From this disclosure, it can now be seen that an improved tractor supported and operated harvester thresher has been provided, which achieves the desirable objects heretofore recited.

It is the intention to cover all changes and modifications of the practicable form herein chosen for purposes of illustration which do not depart from the spirit and scope of the invention as covered in the following claims.

What is claimed is:

1. The combination with a tractor having a central narrow body carried at its front end on a central steering wheel support and having a transverse rear axle structure supported on a pair of widely spaced wheels, of a harvester thresher including a longitudinal thresher part supported on the rear axle structure and from the body of the tractor along one side thereof and parallel therewith, said thresher part being located between the rear wheels, and a harvester part disposed transversely of the rear end of the tractor and supported therefrom, said harvester part and thresher part being cooperatively associated.

2. The combination with a tractor having a central narrow body carried at its front end on a central steering wheel support and having a transverse rear axle structure supported on a pair of widely spaced wheels, of a harvester thresher including a longitudinal thresher part supported on the rear axle structure and from the body of the tractor along one side thereof and parallel therewith, said thresher part being located between the rear wheels, a harvester part disposed transversely across the rear end of the tractor and extending laterally thereof, support means for connecting said harvester part to the rear axle structure of the tractor, said harvester part including an elevator for feeding material into the rear end of the thresher part.

3. The combination with a tractor having a central narrow body carried at its front end on a central steering wheel support and having a transverse rear axle structure supported on a pair of widely spaced wheels, of a harvester thresher including a longitudinal thresher part supported on the rear axle structure and from the body of the tractor along one side thereof and parallel therewith, said thresher part being located between the rear wheels, a harvester part disposed transversely across the rear end of the tractor and extending laterally thereof, a transverse torque tube support associated with the rear axle structure of the tractor, connections from said support for adjustably supporting the harvester part from the tractor, means on the tractor to adjust the harvester part, and an elevator included in the harvester part for feeding material into the thresher part.

4. The combination with a tractor having a central narrow body carried on a front wheel steering support and having a transverse rear axle structure supported on a pair of wide tread wheels, of a harvester thresher including a longitudinal thresher part supported on the rear axle structure to one side of the body, a support for carrying the front end of the thresher part from the tractor body, a rockable support associated with the rear axle structure of the tractor, a harvester part carried for adjustment by the rockable support to the rear of the tractor and operatively associated with the thresher part, means to adjust the harvester part, and a counter-balance operatively connected between the rockable support and the body of the tractor.

5. The combination with a tractor having a central narrow body carried on a front wheel steering support and having a transverse rear axle structure supported on a pair of wide tread wheels, of a harvester thresher including a longitudinal thresher part supported on the rear axle structure to one side of the body, a support for carrying the front end of the thresher part from the tractor body, a harvester part supported from the rear axle structure of the tractor and disposed transversely of the rear end of the tractor in cooperative relationship with the thresher part, an elevator included in the harvester part for feeding material into the rear end of the thresher part, and means for advancing the material through the thresher part forwardly in the direction of travel of the tractor, said thresher part discharging straw from its forward end adjacent the front steering support of the tractor.

6. The combination with a tractor having a central narrow body carried on a front wheel steering support and having a transverse rear axle structure supported on a pair of wide tread wheels, of a harvester thresher including a longitudinal thresher part supported on the rear axle structure to one side of the body, a support for carrying the front end of the thresher part from the tractor body, a harvester part supported from the rear axle structure of the tractor and disposed transversely of the rear end of the tractor in cooperative relationship with the thresher part, a grain storage tank supported by the tractor body in elevated position forwardly of the rear axle structure and in opposed balancing relation with respect to the thresher part, and means for delivering grain from the thresher part into the tank.

7. The combination with a tractor having a longitudinal narrow central body supported on a front wheel steering truck and having a rear axle structure carried on a pair of widely spaced wheels, of a harvester thresher comprising a transverse harvester part supported from the rear axle structure rearwardly of the tractor, and a longitudinal thresher part carried between the rear wheels of the tractor along one side of the tractor body and operatively associated with the harvester part to receive material therefrom, and means for moving the material forwardly through the thresher part in the direction of travel of the tractor.

8. The combination with a tractor having a body, rear axle structure and transmission including a longitudinally rearwardly extended power take-off shaft and a transversely outwardly extending pulley take-off shaft, of a harvester thresher including a longitudinal thresher part carried by the rear axle structure along one side of the body and having operative mechanisms driven from said pulley take-off shaft, and a harvester part transversely disposed at the rear of the tractor in cooperative relationship with the thresher part and including operative mechanisms driven from the power take-off shaft of the tractor.

9. The combination with a tractor having a body, rear axle structure and transmission including a longitudinally rearwardly extended power take-off shaft and a transversely outwardly extending pulley take-off shaft, of a harvester thresher including a longitudinal thresher part carried by the rear axle structure along one side of the body and having operative mechanisms driven from said pulley take-off shaft, a harvester part transversely disposed at the rear of the tractor in cooperative relationship with the thresher part and including operative mechanisms driven from the power take-off shaft of the tractor, and said tractor transmission including a selective gear whereby the operative mechanisms of the harvester and thresher parts may be driven together or be stopped together and irrespective of whether the tractor is being propelled or is standing still.

10. The combination with a tractor having a central narrow body carried on a front wheel steering support and having a transverse rear axle structure supported on a pair of wide tread wheels, of a harvester thresher including a longitudinal thresher part supported on the rear axle structure to one side of the body, a support for carrying the front end of the thresher part from the tractor body, a support associated with the rear axle structure of the tractor, a harvester part including a platform rockably carried by the support for up and down adjustment to the rear of the tractor and operatively associated with the thresher part, means to adjust the harvester part, a counter-balance to spring the weight of the harvester part, and means associated with the rear axle structure to keep the platform substantially horizontal in all positions of its adjustment.

BENJAMIN M. HYMAN.